United States Patent [19]

Beyda

[11] Patent Number: 5,870,610
[45] Date of Patent: Feb. 9, 1999

[54] AUTOCONFIGURABLE METHOD AND SYSTEM HAVING AUTOMATED DOWNLOADING

[75] Inventor: William J. Beyda, Cupertino, Calif.

[73] Assignee: Siemens Business Communication Systems, Inc., Santa Clara, Calif.

[21] Appl. No.: 672,774

[22] Filed: Jun. 28, 1996

[51] Int. Cl.[6] .................................................. G06F 15/177
[52] U.S. Cl. ............................................ 395/712; 395/651
[58] Field of Search ...................................... 395/651, 712, 395/829

[56] References Cited

U.S. PATENT DOCUMENTS

| | | | |
|---|---|---|---|
| 4,982,324 | 1/1991 | McConaughy et al. | 364/200 |
| 5,469,554 | 11/1995 | Tucker et al. | 395/420 |
| 5,483,654 | 1/1996 | Staron et al. | 395/650 |
| 5,555,416 | 9/1996 | Owens et al. | 395/700 |
| 5,619,716 | 4/1997 | Nonaka et al. | 395/800 |
| 5,634,074 | 5/1997 | Smith et al. | 395/829 |
| 5,668,992 | 9/1997 | Hammer et al. | 395/651 |

OTHER PUBLICATIONS

"In the Year 1995", Bill Gott, Lan Magazine, Jun. 1995, vol. 10 n6 p. 105(10).

"Compatibility Compared", Cox et al., PC Magazine, vol. 14 n16 p. 172(4), Sep. 26, 1995.

"Windows 95 Hits the Streets Running: a Report on our First Six Months", Cline, Craig E., The Seybold Report on Desktop Publishing, v 10 n1 p. 3 (11), Sep. 1994.

*Primary Examiner*—Emanuel Todd Voeltz
*Assistant Examiner*—Kakali Chaki

[57] ABSTRACT

A method of upgrading a system, such as a computer, that supports a variety of devices includes locating and identifying a first supported device and determining location information related to a remote site at which device-level software is stored. The determination of location information is an automated response to identifying the first device and the device-level software at the remote site is specific to the identified device. The remote site is automatically accessed via transmission lines. The device-level software is then downloaded from the remote site to the system. In the preferred embodiment, the automated process that frees the user from intervention is carried to the installation of the downloaded software and the autoconfiguration of system resources. For personal computers, the downloaded software is typically driver software.

18 Claims, 2 Drawing Sheets

AUTOCONFIGURABLE METHOD AND SYSTEM HAVING AUTOMATED DOWNLOADING

BACKGROUND OF THE INVENTION

The invention relates generally to a method and system that require different drivers to enable different devices supported by the system, and relates more particularly to automating such a system.

DESCRIPTION OF THE RELATED ART

The addition of an internal adapter card or a peripheral device to a computer typically requires a reconfiguration of the system resources of the computer. This requirement that the computer must be configured to allocate specific system resources to specific devices significantly increases the complexity of upgrading the computer. If two or more devices attempt to utilize the same resource, a hardware and/or software conflict will occur. The system resources that must be allocated include direct memory access (DMA) channels, interrupt request lines (IRQs), memory locations for driver software, and input/output (I/O) memory addresses. Often, physically installing an add-on device is relatively simple, but the reconfiguration of system resources requires expertise that exceeds the capabilities of typical users.

In an attempt to simplify upgrades of computer systems, autoconfiguration technology has received increasing attention. The autoconfiguration technology is sometimes referred to as "plug-and-play technology." The user merely physically installs the device and the computer automatically configures itself in a manner that prevents conflicts. For example, the microprocessor of a personal computer may communicate with the various devices that the computer supports in order to determine which devices are installed, what resources are available for allocation, and what resources are required by the installed devices. The system is then able to determine an acceptable allocation.

While it is not critical to the implementation of the autoconfiguration technology, there are preferably four interacting components to an autoconfiguration process. The first component is the device that is to be added. The device may be a peripheral, an adapter card, or the like. In a plug-and-play environment, the device should be able to identify itself to the other components of the autoconfiguration process and preferably have resource assignments that can be changed depending upon conflict resolutions. A second component is the basic input/output system (BIOS) of the computer. The BIOS can locate, configure and activate the various devices. A third component is the operating system that discovers and resolves resource conflicts. The fourth component is a non-volatile random access memory that stores the configuration data during times in which the computer is shut down. If one or more of the four components are not designed to cooperate with other components to provide plug-and-play capability, the remaining components should be capable of compensating for the absence.

The autoconfiguration technology may be implemented in a number of manners. As an example, the BIOS may check the system bus to determine what devices exist. In a personal computer, the system bus may be an Industry Standard Architecture (ISA) bus, or may be an Extended Industry Standard Architecture (EISA) bus. The BIOS may disable some of the devices, while activating all boot devices. The operating system is then loaded. During the system boot up, the operating system determines the resource requirements of all of the devices and activates the non-boot devices. Preferably, all hardware and/or software conflicts are resolved during the boot up procedure. Any required device drivers are loaded into memory. If an add-on device has been detected by the BIOS, the operating system is notified by the BIOS. The configuration table that has been stored in the non-volatile random access memory is consulted to determine what resources can be allocated to the add-on device and/or whether resources that were previously allocated to existing devices need to be reallocated. A new configuration table can then be stored in the non-volatile random access memory.

In the design of a system or an add-on device that is to cooperate in providing autoconfiguration capability, forward compatibility is typically the issue. That is, system and board designers attempt to accommodate future upgrades that may be installed at a later time. However, backward compatibility is also a concern. For example, when the operating system sold by Microsoft Corporation under the federally registered trademark WINDOWS is upgraded from version 3.1 to WINDOWS95, a driver for a video accelerator board may cause reduced or improper performance. Installing a replacement driver that is specific to the video accelerator board and the upgraded operating system may be required to return performance to at least its original level.

For a computer system that supports a variety of devices, a version upgrade of the operating system may require the user to contact a number of different manufacturers in order to obtain the latest driver software. Many manufacturers maintain network sites that can be accessed via telecommunications lines, permitting users to download available drivers. However, this requires users to possess the expertise to locate the network sites, contact the sites, and download the appropriate driver. For many users, the downloading requirement may defeat the purpose of the plug-and-play technology. This may even be true for situations in which a single driver is to be downloaded from an Internet site, e.g., when the driver software packaged with a particular computer hardware component includes a "bug" that has been fixed by the hardware manufacturer since the packaging of the hardware was shipped by the manufacturer.

What is needed is a system for supporting a number of devices and a method that facilitates system upgrades, preferably within an autoconfiguration environment.

SUMMARY OF THE INVENTION

A method of upgrading a system that supports a variety of devices, such as adapter boards, includes at least partially automating a procedure for downloading device-level software for operating the supported devices. The upgrade procedure includes steps of identifying the first device that is supported by the system and, as an automated response to identifying the first device, determining location information related to a remote site at which the device-level software is stored. In the preferred embodiment, the location information is a network site that is accessed via transmission lines and the device-level software is driver software specific to the identified first device. As an automated response to determining the location information, the system accesses the remote site. The device-level software is then downloaded from the remote site to the system in which the software is to be installed. If the system upgrade is an upgrade of the operating system of a computer, in one embodiment, a second device is then located and identified, so that the automated process can be repeated in obtaining the appropriate device-level software for the second device.

In another embodiment, all of the devices are identified and the relevant remote sites are automatically determined before the network is accessed to download the various pieces of board-level software. The automated process of identifying and accessing a remote site in order to facilitate system upgrades applies to other multi-device systems in which there is a required association between a particular device and specific board-level software.

DETAILED DESCRIPTION

Figure 1:
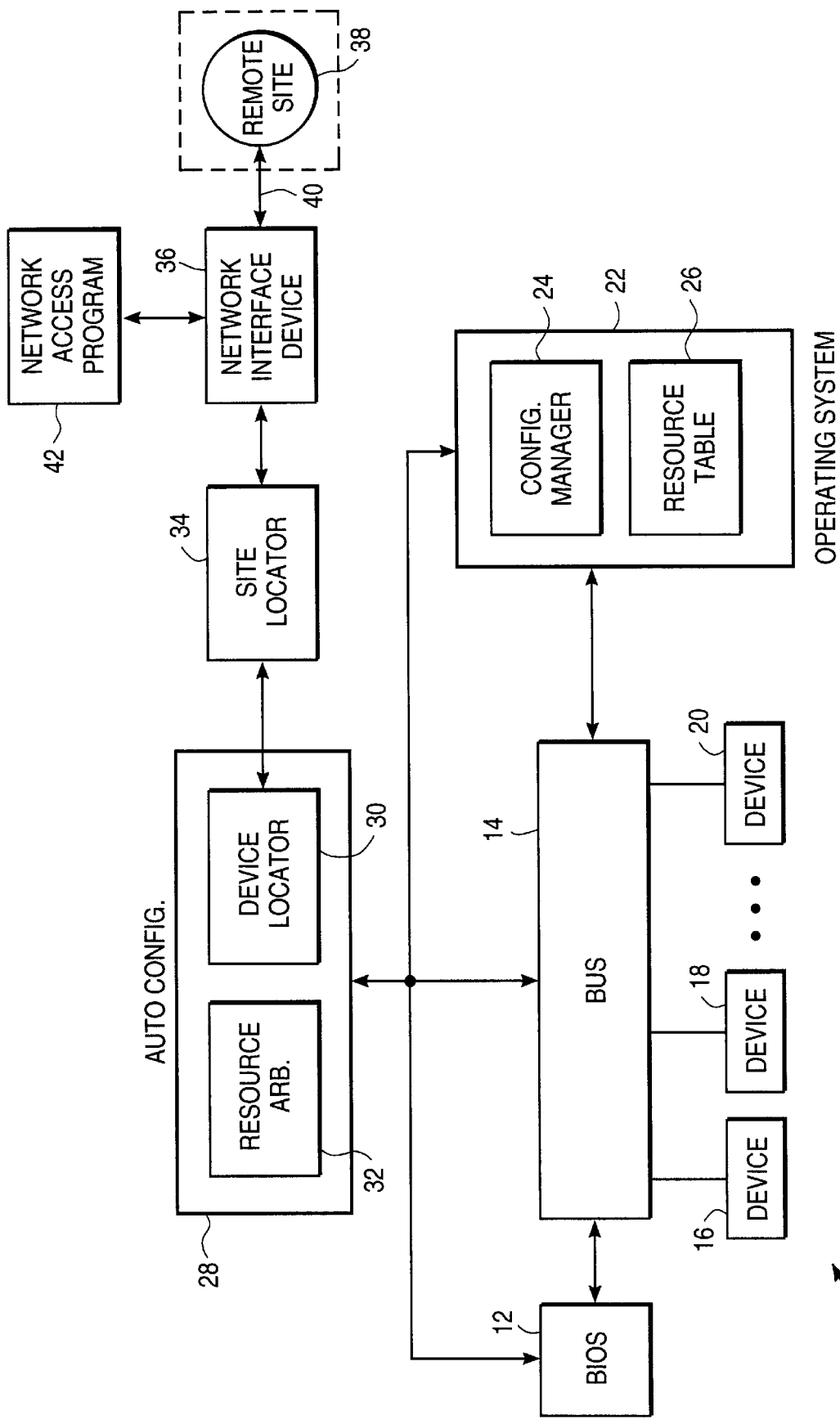
FIG. 1 is a block diagram of a system for executing system upgrades in accordance with the invention.

An automated method of upgrading a system includes recognizing a system-supported device as being one that requires device-specific software, identifying a remote site at which the software is stored, accessing the remote site via transmission lines, downloading the device-specific software, and installing the device and the software properly. At least some and preferably all of the steps are implemented without a requirement of user intervention. Preferably, the method is executed within a system that is designed for autoconfiguration of system resources, so that any resource conflicts among different devices are resolved without requiring user intervention.

At the time of installing an add-on device or at the time of upgrading an operating system, the system detects and identifies the device using autoconfiguration technology, which is also referred to as "plug-and-play technology." Typically, the add-on device of concern includes a requirement of installing hardware, but this is not critical. The automated process also may be utilized to locate and download a "driver" for an application program that requires specific system resources and requires a particular association with other software in order to operate properly.

As an automated response to detecting and identifying the device, a remote site is identified. The location information may be an address of an Internet site. For example, driver software may be stored for access via a site on the World Wide Web (WWW) for downloading by means of File Transfer Protocol (FTP). Alternatively, the site may be a bulletin board that is maintained by the vendor of the device of concern.

The automated system establishes communication with the remote site via a telecommunications line. This may be accomplished by means of a modem or an interface to an ISDN or other digital network. The established communication allows driver software to be downloaded. In the preferred embodiment, the downloading is accomplished without user intervention. When the method is utilized within the autoconfiguration environment, the downloaded software may be automatically installed using techniques known by persons skilled in the art.

The preferred embodiment utilizes the automated method with a personal computer. However, this is not critical. Any system that includes the sophistication to require identification of a specific association between a device and a particular piece of software can utilize the method. For example, a private branch exchange (PBX) that is attached to a network can automatically download the latest version of board-level software from a manufacturer when a new board is installed, such as when a line card is added. The technique of automatically accessing a remote site that is maintained by a vendor of computer hardware may also be used in other applications. For example, the steps of identifying a particular remote site and automatically initiating communication between a system and the remote site may be used in the registration procedure. That is, after a device has been installed into a personal computer, the computer may automatically contact a vendor-maintained site that requires a user to input the information required for registering the product. Foreseeably, the registration information may be obtained directly from computer memory. This requires some interrogation of the personal computer by the vendor-maintained site. In another embodiment, the vendor-maintained site interrogates the personal computer to determine the proper resource allocation. This embodiment is beneficial if the personal computer is not designed to provide full autoconfiguration capability. In still another embodiment, the automated method is utilized as a user's response to a suspicion or determination that board-level software includes a "bug." For example, if a device is operating improperly, the user may initiate the automated process by requesting a software "refresh" to identify the remote site and download the appropriate device-level software. Thus, if the vendor of the device has recently upgraded the device-level software to address the "bug," the upgraded software will be automatically downloaded to the user's system.

Referring now to FIG. 1, an exemplary system 10 for implementing the automated downloading process is shown. The system includes a conventional Basic Input/Output System (BIOS) 12. The BIOS is connected to access the bus or buses 14. The bus may be a conventional EISA bus, but other known buses having different addressing protocols may be utilized. The bus logically supports various devices 16, 18 and 20. Often, the bus also physically supports the devices, such as in circumstances in which adapter cards are inserted into board slots that provide the bus connections. However, the devices may also be connected to the bus 14 via cables.

An operating system 22 also functions in a manner well known in the art. The type of operating system is not critical. The operating system 22 includes a number of modules. The two modules that are most relevant to the automated downloading process are shown in FIG. 1. A configuration manager 24 controls resource allocation to the various devices 16, 18 and 20. The resources that must be properly allocated in order to avoid conflicts include interrupt request, I/O and memory addresses, and direct memory access channels. As will be explained more fully below, when a conflict-free configuration has been determined, the configuration is stored as a resource table 26 in non-volatile random access memory. Consequently, the information from the resource table 26 is available each time that the system 10 is booted.

An autoconfiguration component 28 performs the functions provided by autoconfiguration technology. In one embodiment of autoconfiguration, a device locator 30 identifies one of the devices 16, 18 or 20. For example, if the first device 16 has been added since the last boot up of the system 10, the device locator 30 identifies the first device. The first device is then "interrogated" in order to determine resource requirements of the device. If no potential conflicts exist, the autoconfiguration component 28 passes the resource requirements to the configuration manager 24, and an updated resource table 26 is stored in non-volatile random access memory. On the other hand, if the system requirements of the first device 16 are unavailable, a resource arbitrator 32 is activated. The resource arbitrator calculates a configuration that is designed to avoid conflicts during operation of the system 10. At times, this requires the reassignment of resources that were previously allocated to other devices 18 and 20. When an acceptable allocation is determined, the configuration is submitted to the configuration manager 24, which generates an updated resource table 26.

The autoconfiguration component 28 may be responsive to the BIOS 12 or the operating system 22, but is preferably able to cooperate with both. That is, the configuration of system resources preferably can be controlled by either the BIOS 12 or the operating system 22. Additionally, a user may elect to disable the autoconfiguration component 28 in part or in whole, allowing the user to manually configuration the system 10.

In addition to the known functions of the system 10, the system includes a site locator 34 that is used to determine the identity of a remote site 38. The remote site is accessed via a network interface device 36 for connecting the system 10 to a site that is unsupported by the system. The connection to the remote site is made via transmission lines 40, and the device 36 may be a modem or an interface to an ISDN or other digital network. In the preferred embodiment, the transmission lines are telecommunication lines, such as standard telephone lines, ISDN lines, T-1 lines, or any other digital standard. The remote site may be one that is maintained by a vendor of the first device 16. As previously noted, the site that is identified by the site locator 34 includes software that is relevant to operation of the first device 16.

The site locator 34 "interrogates" the first device 16 that is identified by the device locator 30. If the location information for identifying and accessing the remote site 38 is a telephone number of a publicly accessible bulletin board system (BBS), the telephone number is utilized to trigger the network interface device 36. On the other hand, if the remote site is a WWW site, a Web access program 42 of the system 10 is automatically activated and used in conjunction with the network interface device 36 to access the site.

Figure 2:
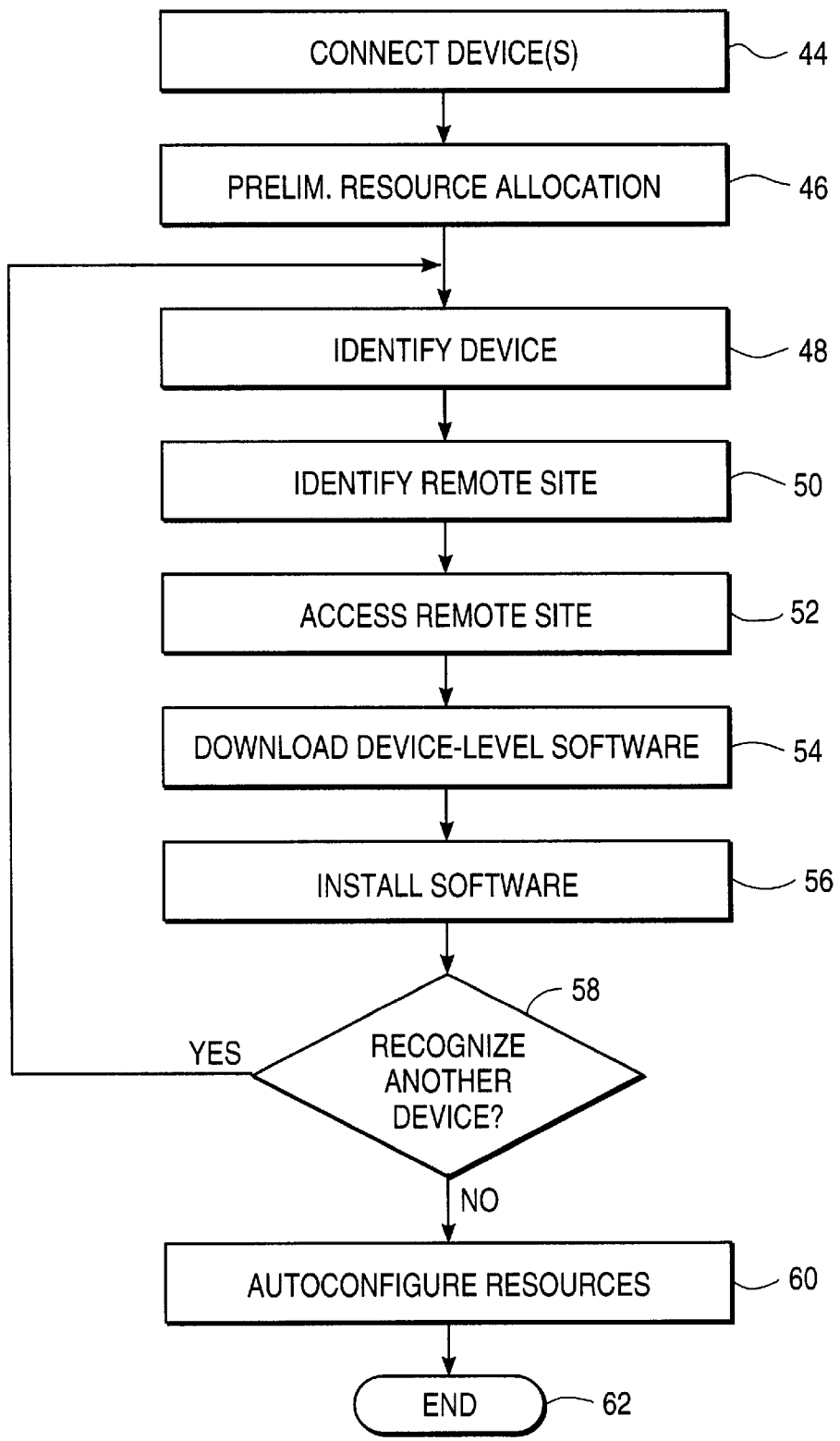
FIG. 2 is a flow chart of steps that are executed in using the system of FIG. 1.

Referring now to FIG. 2, in a first step 44, a device is connected to the system. Remaining consistent with the example above, the first device 16 may be an adapter card that is inserted into a board slot to connect the first device to the bus 14 of FIG. 1. When the system is then booted, a preliminary assignment of system resources is established at step 46. In step 48, the bus 14 is scanned and the add-on first device 16 is located and identified. Preferably, the device locator 30 of the autoconfiguration component 28 cooperates with both the BIOS 12 and the operating system 22 to identify the add-on device. Designers of devices for autoconfiguration capability build in an identifier within the device, using techniques known in the industry. However, the method of FIG. 2 requires a device designer to also provide identification of the remote site 38 from which driver software specific to the first device 16 can be downloaded. At step 50 the location information is acquired by the site locator 34.

In one embodiment, the step 50 of identifying the remote site includes receiving data that is stored directly on the first device 16. In another embodiment, in addition to installing the hardware, the installation of the first device includes loading a computer disk that provides the required site location. The data contained on the disk is less likely to be "downlevel" than is the driver software that is conventionally packaged with the add-on hardware. The first embodiment in which the location information is stored in firmware is the preferred embodiment.

In step 52, the remote site is accessed using the transmission lines 40. As previously noted, possible network interface devices 36 for accessing the remote site 38 include modems and conventional interfaces to an ISDN or other digital network. While not critical, the method preferably includes an automated step of downloading 54 the device-level software. For the first device 16 of FIG. 1, this is a download of a latest version of a driver that is specific to the first device 16. The downloaded software is then installed 56. Again, this is preferably an automated step.

By automating at least some of steps 48–56, the user intervention in installing the device and installing a driver is reduced. Installing the latest version of driver software no longer requires expertise in contacting remote sites and downloading from those sites. Automating all of steps 48–56 frees a user from the burden typically associated with the installation process. Another advantage is that the user is ensured of installing the latest version of the device-level software for the device 16.

A determination of whether a second device is to be recognized is made at step 58. If a user has connected two devices at step 44, it will be necessary to repeat steps 48–56 for the second device. Repeating the steps is also required if the step 44 of connecting one or more devices is replaced with a step of upgrading the operating system to install a new version. A significant upgrade of the operating system may require a replacement of the driver software for each of the devices 16, 18 and 20 in order to maximize performances of the individual devices.

If at step 58 the determination is made that no further device-level software is required, step 60 is a known step of autoconfiguring the system resources. This step is executed by the autoconfiguration component 28 of FIG. 1. An updated resource table 26 is then stored at the operating system level, and the process is ended 62. The user is then able to utilize any of the devices 16, 18 and 20.

As an alternative embodiment to FIG. 2, steps 48 and 50 may be steps in which all of the relevant devices and the appropriate remote sites are identified before the network is accessed for downloading software. In this embodiment, only one connection to the network is required, potentially providing savings with respect to time and/or connection costs.

While the invention has been described and illustrated primarily with respect to upgrading a personal computer, the invention may be used in other applications. The system and method may be utilized in any application in which there is sufficient sophistication to require an identification of a specific device and an association of the device with specific software.

I claim:

1. A method of upgrading a system for supporting a plurality of devices comprising steps of:

locating a first device that is to be supported by said system;

as an automated response to locating said first device, determining location information relating to a remote site at which driver software specific to said first device is stored, said remote site being unsupported by said system;

as an automated response to determining said location information, accessing said remote site via transmission lines; and downloading said driver software to said system from said remote site.

2. The method of claim 1 wherein said step of locating said first device is a step that is executed using techniques of plug-and-play technology.

3. The method of claim 1 wherein said step of determining said location information includes identifying an address within a network.

4. The method of claim 3 wherein said system is a personal computer and said step that includes identifying an address includes designating an Internet address, and wherein said step of accessing said remote site includes using telecommunications lines.

5. The method of claim 1 wherein said step of locating said first device includes detecting presence of a computer hardware device at a boot up of a computing system, said method further comprising a step of automatically installing said driver software after said step of downloading.

6. The method of claim 1 wherein said step of locating said first device is an automated response to one of either upgrading an operating system of a computer or detecting presence of an add-on device to said computer.

7. The method of claim 6 further comprising a step of autoconfiguring system resources following said step of downloading said driver software, said autoconfiguring being based upon resource requirements of said devices supported by said system.

8. The method of claim 1 wherein said step of determining location information is a step of designating information that identifies a site that is maintained by a manufacturer of said first device.

9. A method of initializing a device into a system comprising steps of:

installing said device into said system, including connecting computer hardware and including providing system-accessible information identifying a remote site that relates to a supplier of said device;

in an absence of user intervention, initiating communication between said system and said remote site in response to said system accessing said system-accessible information, including utilizing telecommunication lines to establish said communications; and exchanging data between said system and said remote site, including exchanging data relating to operating said device within said system.

10. The method of claim 9 wherein said step of exchanging data includes downloading driver software from said remote site to said system.

11. The method of claim 10 wherein said step of downloading driver software is executed in an absence of user intervention.

12. The method of claim 9 wherein said step of initiating communication includes utilizing one of a modem or an interface to an ISDN or other digital network.

13. A system that is capable of autoconfiguration to accommodate support of a plurality of devices comprising:

means for identifying a first device as a device for which driver software is desired, said first device being one of said plurality of devices;

site-detection means, responsive to said means of identifying, for detecting location information as an automatic response to said identifying said first device, said site-detection means having an output signal that is indicative of said location information that designates a remote site unsupported by said system;

means, responsive to said output signal of said site-detection means, for automatically accessing said remote site via transmission lines; and storage means for receiving said driver software downloaded from said remote site via said transmission lines.

14. The system of claim 13 wherein said means for automatically accessing said remote site is one of a modem or an interface to an ISDN or other digital network.

15. The system of claim 13 wherein said means for identifying, said site-detection means and said storage means are components of a computer system.

16. The system of claim 13 wherein said site-detection means is a means for identifying a network site maintained by a vendor of said first device.

17. The system of claim 13 further comprising means for automatically initiating an allocation of system resources to said first device partially based upon said downloaded driver software.

18. A method of automatically refreshing driver software of a device supported by a system, said method comprising steps of:

in response to a determination that said device is operating improperly, requesting that driver software specific to said device be acquired;

as an automated response to said request, identifying a remote network site at which said driver software can be downloaded;

as an automated response to said identification of said remote network site, accessing said site via telecommunications lines and downloading said driver software; and installing said downloaded driver software.

\* \* \* \* \*